US011389028B2

(12) United States Patent
Casey et al.

(10) Patent No.: US 11,389,028 B2
(45) Date of Patent: Jul. 19, 2022

(54) OIL FILTRATION SYSTEM AND METHOD FOR AUTOMATED FRYER

(71) Applicant: Henny Penny Corporation, Eaton, OH (US)

(72) Inventors: William M. Casey, Kettering, OH (US); Charles Leader, Napoleon, OH (US); Robert Panning, Napoleon, OH (US); Bruce Miller, Archbold, OH (US)

(73) Assignee: Henny Penny Corporation, Eaton, OH (US)

( * ) Notice: Subject to any disclaimer, the term of this patent is extended or adjusted under 35 U.S.C. 154(b) by 0 days.

(21) Appl. No.: 17/063,938

(22) Filed: Oct. 6, 2020

(65) Prior Publication Data

US 2021/0015302 A1 Jan. 21, 2021

Related U.S. Application Data

(62) Division of application No. 15/945,350, filed on Apr. 4, 2018, now Pat. No. 11,147,418.

(Continued)

(51) Int. Cl.
*A47J 37/12* (2006.01)
*A47J 37/04* (2006.01)

(52) U.S. Cl.
CPC ......... *A47J 37/1214* (2013.01); *A47J 37/045* (2013.01); *A47J 37/1219* (2013.01); *A47J 37/1223* (2013.01); *A47J 37/1271* (2013.01)

(58) Field of Classification Search
CPC .. A47J 37/1214; A47J 37/045; A47J 37/1219; A47J 37/1223; A47J 37/1271
See application file for complete search history.

(56) References Cited

U.S. PATENT DOCUMENTS

| 2,253,567 A | 8/1941 | Kochenour et al. |
| 2,475,523 A | 7/1949 | Schroeder |

(Continued)

FOREIGN PATENT DOCUMENTS

| DE | 1404770 A1 | 2/1969 |
| FR | 1279955 A | 12/1961 |

(Continued)

OTHER PUBLICATIONS

European Patent Office, Official Communication and Partial Search Report issued in EP App. No. 18166077.0-1006, dated Jun. 13, 2018 (16 pages).

(Continued)

*Primary Examiner* — Nirvana Deonauth
(74) *Attorney, Agent, or Firm* — Wood Herron & Evans LLP

(57) ABSTRACT

A fryer includes a cooking chamber for holding a cooking medium, at least one heating element positioned within the cooking chamber, and a chain conveyor for selectively advancing food product through the cooking chamber along a movement path. The chain conveyor includes first and second chains coupled together by a plurality of baskets extending therebetween. The movement path includes a series of legs, including a first leg wherein the food product moves substantially vertically from above the cooking medium to a greatest depth within the cooking medium and including a second leg subsequent to the first leg wherein the food product moves substantially horizontally at the greatest depth within the cooking medium. Automated filtering systems and methods for removing debris from cooking medium are also provided.

15 Claims, 12 Drawing Sheets

Related U.S. Application Data

(60) Provisional application No. 62/482,902, filed on Apr. 7, 2017.

(56) References Cited

U.S. PATENT DOCUMENTS

| | | | |
|---|---|---|---|
| 2,855,308 | A | 10/1958 | Buechele et al. |
| 3,011,646 | A | 12/1961 | Boronkay |
| 3,552,300 | A | 1/1971 | Matzke et al. |
| 3,637,401 | A | 1/1972 | Kuhlman |
| 4,103,606 | A | 8/1978 | Gitcho |
| 4,152,975 | A | 5/1979 | Jones |
| 4,372,200 | A | 2/1983 | Caridis et al. |
| 4,548,130 | A | 10/1985 | Diener et al. |
| 4,694,742 | A | 9/1987 | Dover |
| 5,137,740 | A | 8/1992 | Benson et al. |
| 5,205,208 | A | 4/1993 | Gongwer |
| 6,062,132 | A | 5/2000 | Morris |
| 6,067,899 | A | 5/2000 | Caridis et al. |
| 9,161,659 | B2 | 10/2015 | Lambert et al. |
| 2002/0006460 | A1* | 1/2002 | Hwang ............... B01D 21/262 210/100 |
| 2005/0011368 | A1 | 1/2005 | Falk |
| 2009/0039004 | A1 | 2/2009 | Andersen |

FOREIGN PATENT DOCUMENTS

| | | |
|---|---|---|
| GB | 1248629 A | 10/1971 |
| JP | S52154542 A | 12/1977 |
| JP | S6137079 A | 2/1986 |
| JP | 2000041866 A | 2/2000 |
| JP | 3343695 B2 | 11/2002 |
| JP | 4632146 B2 | 2/2011 |

OTHER PUBLICATIONS

European Patent Office, Search Report issued in EP Application No. 18 16 6077.0 dated Sep. 21, 2018 (13 pages).

European Patent Office, Official Communication and Extended Search Report issued in EP App. No. 20153146.4-1004 dated Jun. 19, 2020 (11 pages).

European Patent Office, Official Communication and Extended Search Report issued in EP App. No. 20153156.3-1004 dated Jul. 10, 2020 (10 pages).

* cited by examiner

OIL FILTRATION SYSTEM AND METHOD FOR AUTOMATED FRYER

CROSS REFERENCE TO RELATED APPLICATIONS

This application is a divisional application of and claims the benefit of U.S. patent application Ser. No. 15/945,350, filed Apr. 4, 2018, which claimed the benefit of U.S. Provisional Patent Application Ser. No. 62/482,902, filed Apr. 7, 2017 (expired), the disclosures of which are incorporated by reference herein in their entireties.

TECHNICAL FIELD

This application relates generally to food product cooking systems and methods. More specifically, this application describes mechanisms and methods for adding space and time efficiencies in food production environments such as restaurants.

BACKGROUND

Cooking devices, such as fryers, are used to cook various food products, e.g., poultry, fish, potato products, and the like. Such cooking devices may include one or more cooking chambers, e.g., fryer pots or vats, which may be filled with a cooking medium, e.g., an oil, a liquid shortening, or a meltable-solid shortening. Such cooking apparatuses also may include a heating element, e.g., an electrical heating element, such as a heating coil, or a gas heating element, such as a gas burner and gas conveying tubes, which heat the cooking medium in the cooking chamber. After the cooking medium reaches a preset cooking temperature, the food products are placed into the cooking medium such that the food products are cooked in the cooking medium. For example, the food products may be positioned inside a container, e.g., a wire basket, and submerged in the cooking medium for a predetermined amount of time sufficient to cook the food products.

In some designs, the container may be automatically conveyed through the cooking chamber along a movement path in the oil to reduce the amount of involvement required by restaurant employees for properly cooking the food products and/or to cook multiple containers of food products in a continuous cycle. In this regard, for high volume productions, such as those typical in a fast food restaurant environment, a number of containers may be continuously conveyed in a carousel-like fashion. Such high volume fryers are typically relatively large to accommodate the full extent of the movement path of the containers through the cooking chamber. In particular, these fryers typically have a large footprint and thus occupy a large amount of floor space, leaving limited space for additional fryers, other equipment, storage, employees, etc. For example, some fryers of this type have a footprint of approximately 72 inches wide×36 inches deep×72 inches tall. The space allotted to the fryer may also be vertically bounded by a corresponding hood, such as an exhaust or vent hood, positioned thereover. Thus, the benefits of such fryers may be outweighed by the amount of horizontal and/or vertical space which they require.

Moreover, the quality of the oil in the cooking chamber must be maintained at a desired level of purity to extend the useful life of the oil. Typical oil filtration systems require a dedicated oil filtration cycle, wherein container conveyance and food product cooking are interrupted while the oil is treated. For example, the oil may be completely or partially drained from the cooking chamber during this process such that insufficient oil is present in the cooking chamber for proper cooking of the food products. The filtration cycle may also require the heating element to be shut off for safety reasons. Once the oil filtration cycle is complete, normal operation may resume until the next oil filtration cycle. The intermittent interruptions caused by the oil filtration cycles necessarily results in undesirable delays and decreased production.

Thus, it would be desirable to provide systems and methods to cook food product in a more efficient manner, specifically with regard to time and space considerations.

SUMMARY

In one embodiment, a fryer includes a cooking chamber for holding a cooking medium and at least one heating element positioned within the cooking chamber. The fryer also includes a chain conveyor for selectively advancing at least one basket configured to contain food product through the cooking chamber along a movement path defining a continuous loop, the chain conveyor including first and second chains coupled together by the at least one basket extending therebetween. The movement path includes a series of legs such that the at least one basket moves substantially vertically from above the cooking medium to a greatest depth within the cooking medium and subsequently moves substantially horizontally at the greatest depth within the cooking medium.

In another embodiment, a fryer includes a cooking chamber for holding a cooking medium and at least one heating element positioned within the cooking chamber. The fryer also includes a conveyor for selectively advancing at least one basket configured to contain food product through the cooking chamber along a movement path, the basket including a lid portion hingedly coupled to a bottom portion such that the lid portion is pivotable relative to the bottom portion between an opened position and a closed position. The fryer further includes a lid rail catch bar configured to engage the lid portion of the basket and a bottom rail catch bar configured to engage the bottom portion of the basket. Engagement between the lid rail catch bar and the lid portion and engagement between the bottom rail catch bar and the bottom portion during advancement of the conveyor cause the lid portion to pivot relative to the bottom portion toward the opened position for dispensing food product from the basket.

In yet another embodiment an oil filtration system for a fryer includes a housing defining an interior space and including an inlet for supplying unfiltered oil to the interior space and an outlet for dispensing filtered oil from the interior space, the unfiltered oil containing particles of debris collected from food products during operation of the fryer. The oil filtration system also includes a conveyor belt positioned in the interior space for receiving the unfiltered oil from the inlet and for advancing at least a portion of the unfiltered oil through the interior space, the conveyor belt formed from material that allows passage of oil without particles towards the outlet. The oil filtration system further includes a scraper positioned in the interior space, wherein at least a portion of the scraper contacts the conveyor belt to inhibit the advancement of particles within the oil on the conveyor belt, thereby converting the unfiltered oil into filtered oil before flow towards the outlet.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrate one or more embodiments of the invention, and, together with the general description given above and the detailed description given below, serve to explain the one or more embodiments of the invention.

DETAILED DESCRIPTION

With reference to FIGS. 1-7, an automated cooking apparatus such as a fryer 10 is shown in accordance with one embodiment. As set forth in further detail below, the fryer 10 provides improved efficiency in cooking operations. For example, the fryer 10 is capable of cooking a high volume of food products in a relatively small space. In one embodiment, the fryer 10 may cook approximately 240 pounds of boneless chicken patties per hour. Thus, the fryer 10 may cook twice as much food product as a typical 2-well fryer occupying the same footprint, which would only cook approximately 120 pounds of boneless chicken patties per hour. The fryer 10 is also capable of filtering oil while continuously cooking food products to maintain uninterrupted production and avoid delays associated with dedicated oil filtration cycles. The features of the fryer 10 are set forth in further detail below to clarify each of these functional advantages and other benefits provided in this disclosure.

Figure 1:
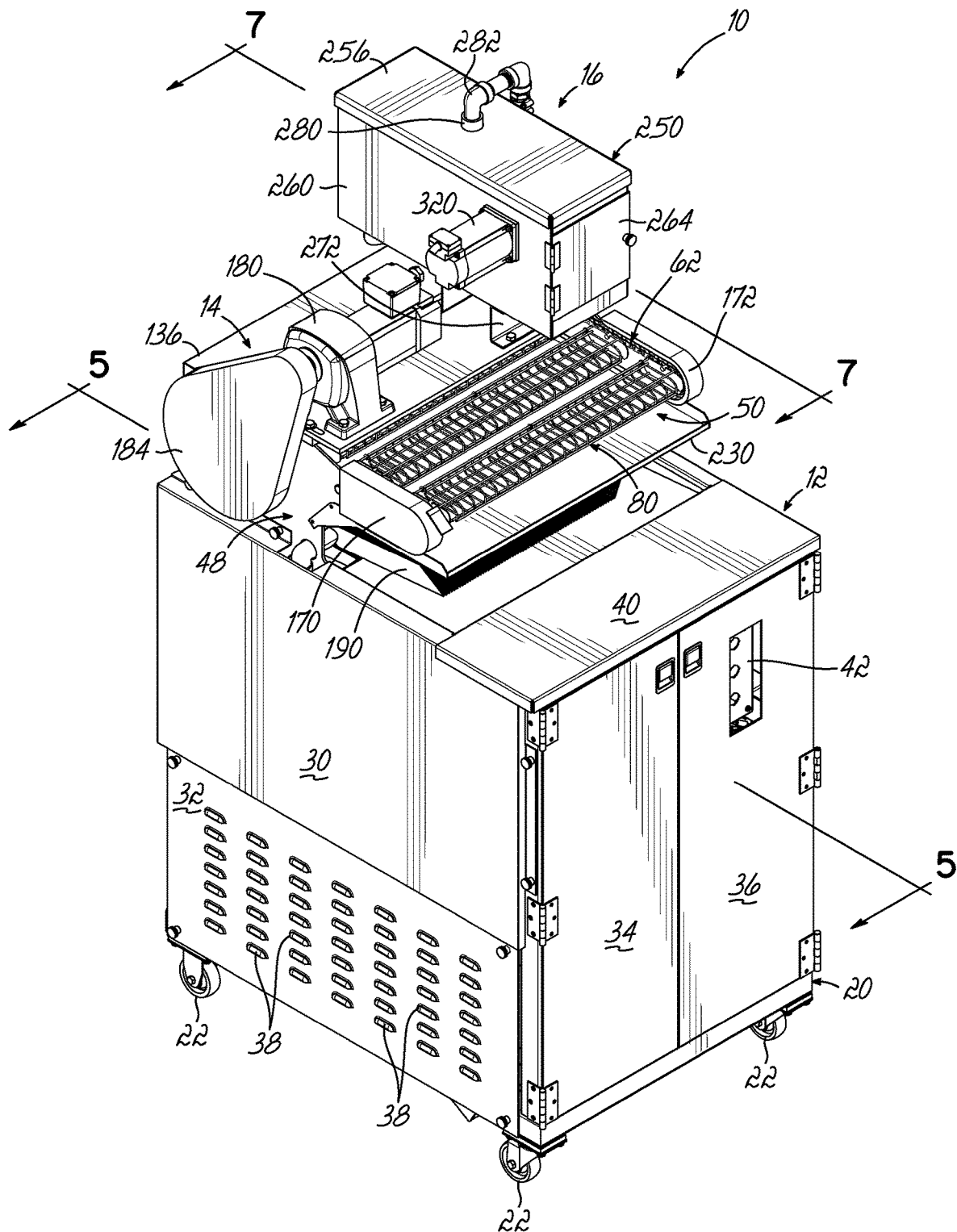
FIG. 1 is a perspective view of an exemplary fryer in accordance with one embodiment of the invention.
Figure 2:
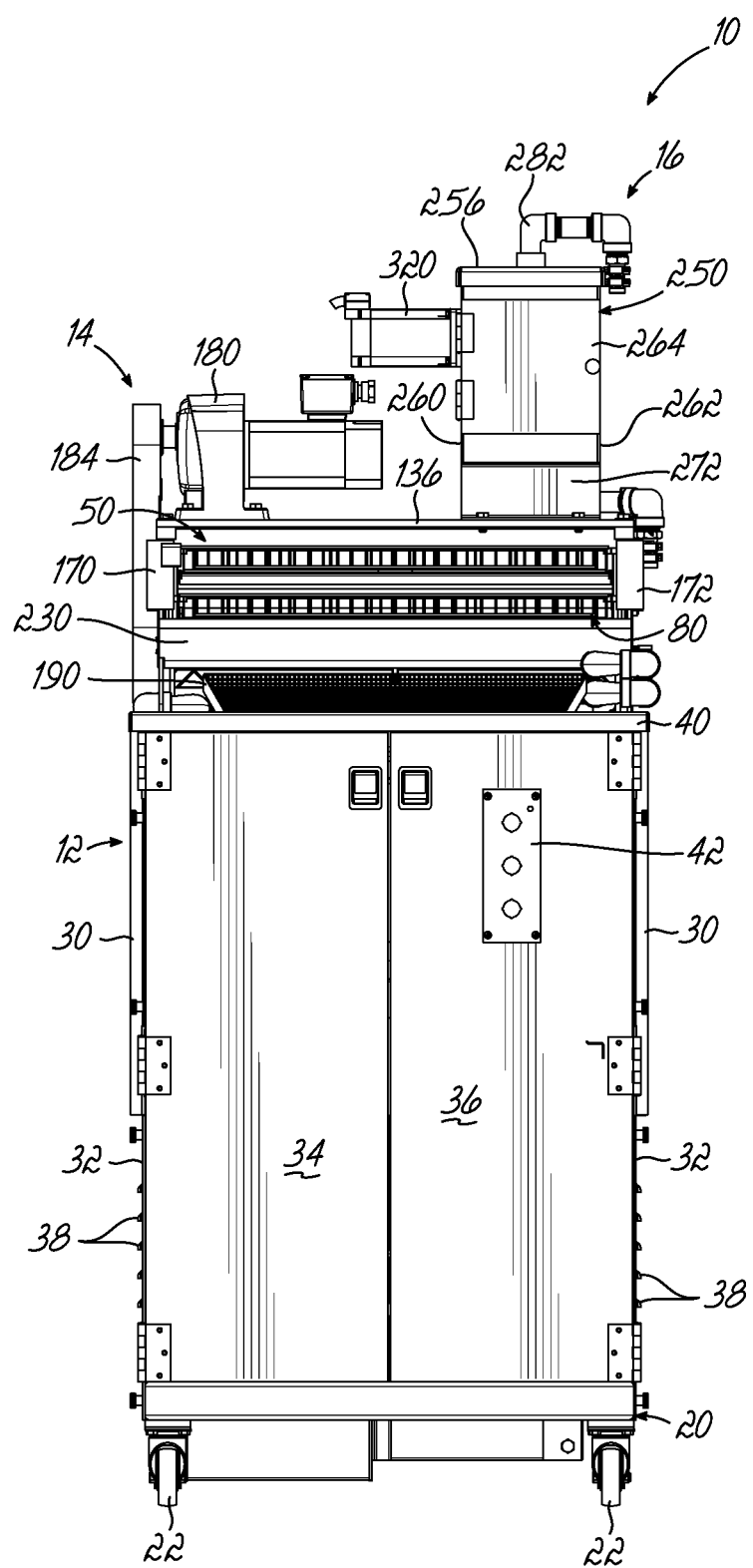
FIG. 2 is a front elevation view of the fryer of FIG. 1.
Figure 3:
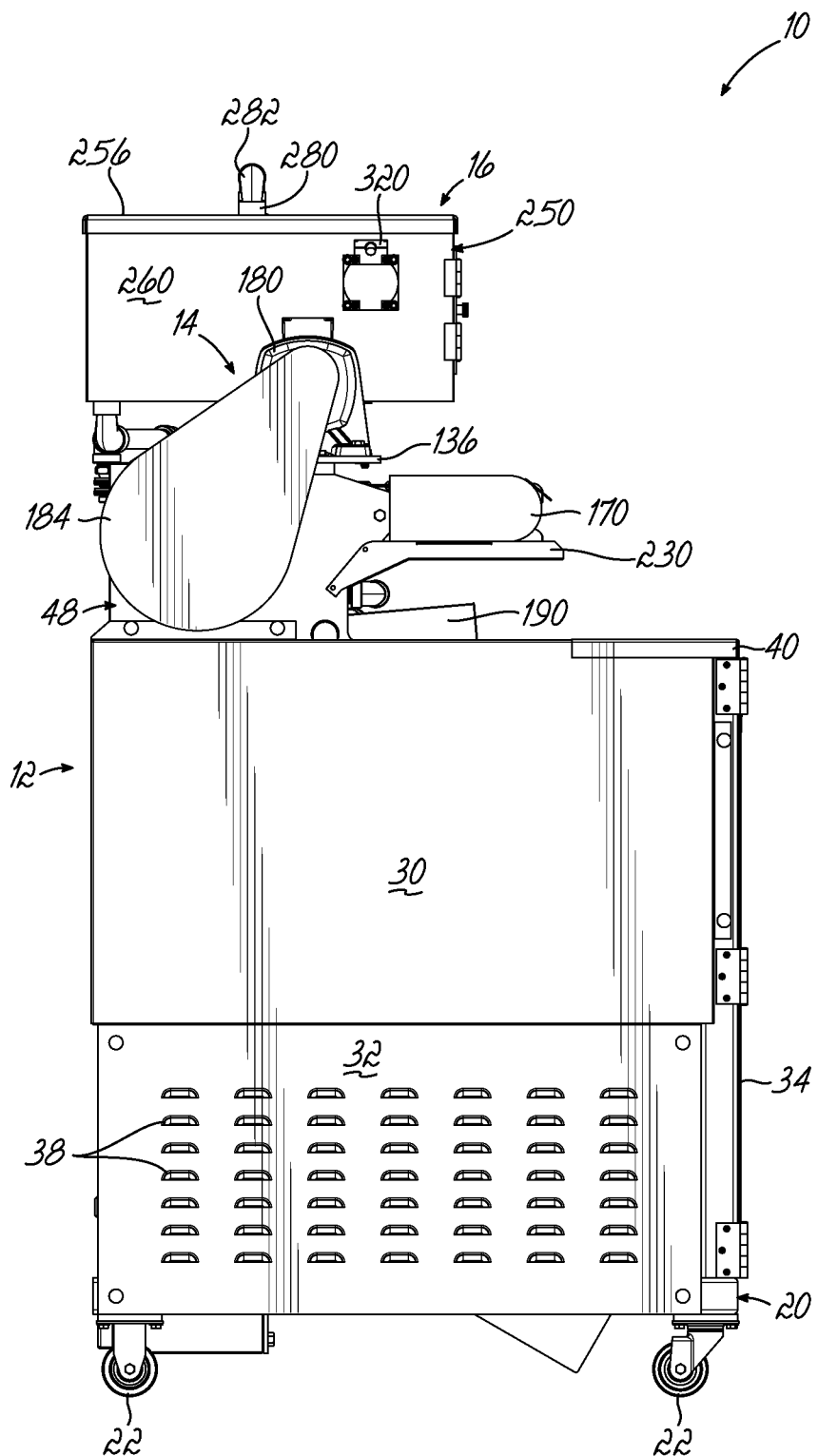
FIG. 3 is a left side elevation view of the fryer of FIG. 1.

As shown in FIGS. 1-3, the fryer 10 is of a generally upright or vertically oriented configuration, and includes a main housing 12, a chain driving assembly 14, and a continuous oil filtration system 16. The main housing includes a frame 20 mounted on a plurality of wheels 22 so that the fryer 10 may be easily moveable on a surface such as a floor. In one embodiment, one or more of the wheels 22 may be lockable to prevent unwanted movement of the fryer 10 during operation. Alternatively, the wheels 22 may be eliminated in other embodiments without departing from the scope of the invention.

Upper and lower wall panels 30, 32 and/or first and second doors 34, 36 are provided on the frame 20 to cover various interior portions of the main housing 12. The doors 34, 36 may provide access to components or other items contained within the main housing 12, and some or all of the wall panels 30, 32 may be removable for this purpose. As shown, the lower wall panels 32 include vents 38 for allowing heat within the main housing 12 to escape. A table top 40 is mounted on top of the frame 20 and may be used to support food products, containers, utensils, or other items. For example, a user, such as a restaurant employee, may place containers of uncooked and/or cooked food products on the table top 40 during a food preparation process. A control panel 42 mounted on the second door 36 provides a human-machine interface configured to receive commands from a user, such as a restaurant employee, and may display information regarding a status of the fryer 10. It will be appreciated that various modifications may be made to the wall panels 30, 32, doors 34, 36, table top 40, and/or control panel 42 without departing from the scope of the invention. In any event, the main housing 12 houses a fryer manifold 48 and a chain conveyor 50 for selectively advancing food product through a cooking chamber 52 (FIG. 5) of the fryer manifold 48, as discussed in greater detail below.

Figure 4A:
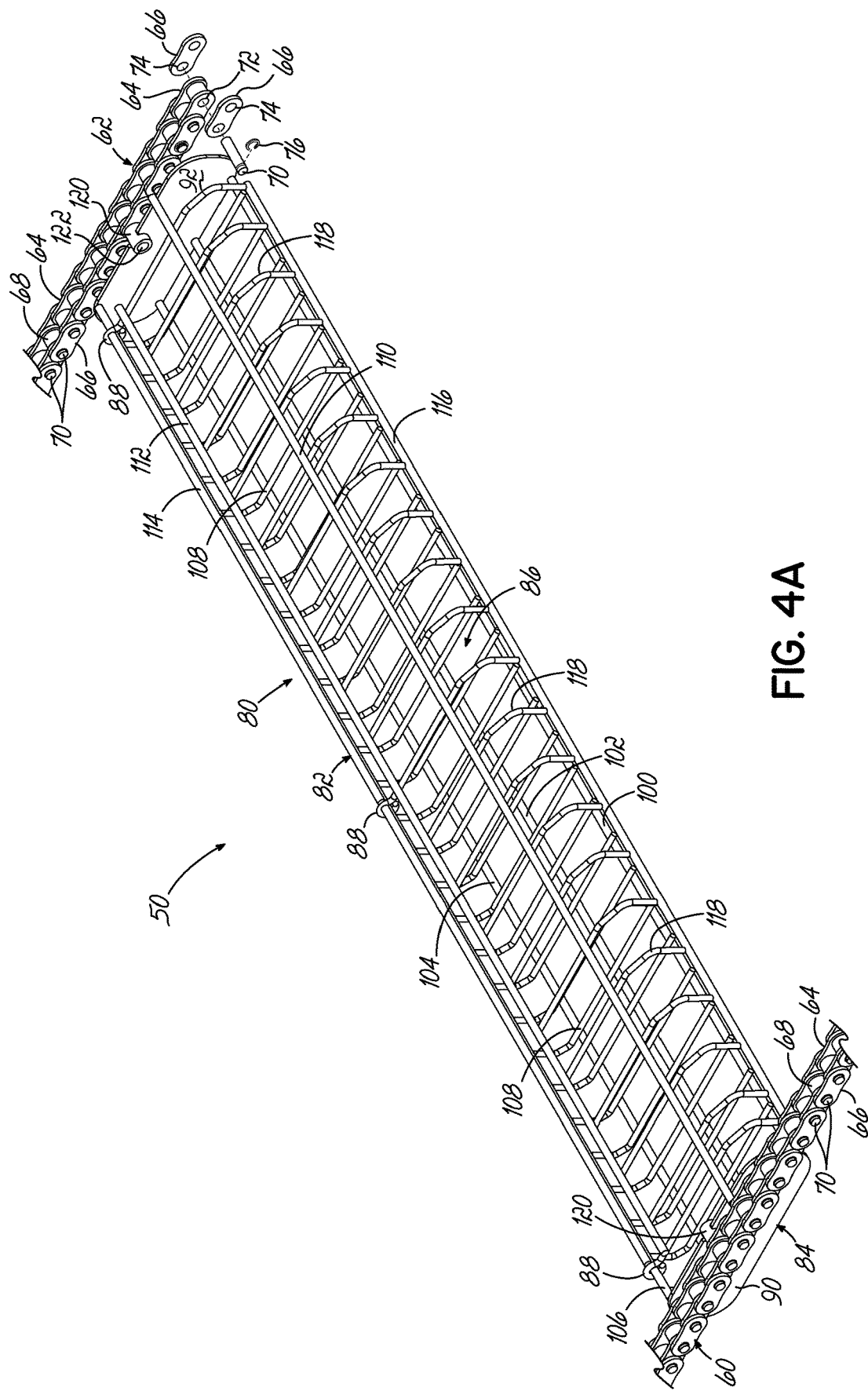
FIG. 4A is a perspective view of the basket shown in FIG. 1 showing the basket in a closed position.
Figure 4B:
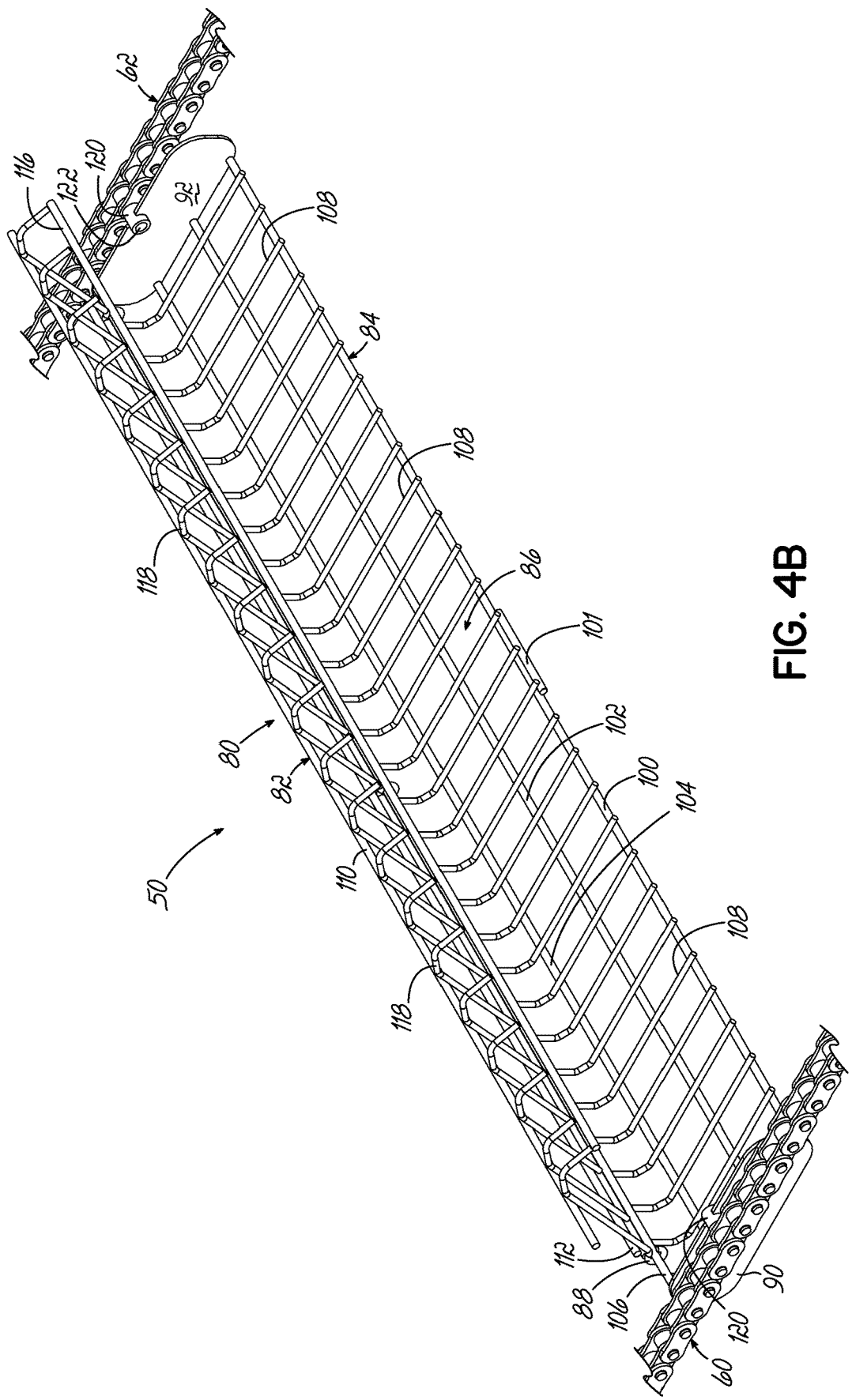
FIG. 4B is a perspective view similar to FIG. 4A showing the basket in an opened position.

Referring now to FIGS. 4A and 4B, with continued reference to FIGS. 1-3, the chain conveyor 50 includes first and second chains 60, 62. More particularly, each of the chains 60, 62 is a roller chain and includes a series of inner links 64, outer links 66, rollers 68, and pins 70, and each of the inner and outer links includes two apertures 72, 74 sized and spaced apart to receive the pins 70, as is known. The pins 70 may be secured within the apertures 72, 74 via a friction fit and/or via a spring clip 76.

As shown, the first and second chains 60, 62 are spaced apart and coupled together by a plurality of baskets 80. Each basket 80 includes a lid portion 82 coupled to a bottom portion 84. Together, the lid portion 82 and bottom portion 84 define an interior space 86 of the basket 80. As shown, the lid portion 82 is coupled to the bottom portion 84 via a number of hinges or hooks 88, as discussed in greater detail below. In this manner, the lid portion 82 and bottom portion 84 are pivotable relative to each other about the hinges 88 between a closed position (FIG. 4A) restricting access to the interior space 86 and securing the contents of the basket 80, and an opened position (FIG. 4B) providing access to the interior space 86 for loading and/or unloading food. In one embodiment, the interior space 86 may be sized to accommodate a small batch of food. For example, the interior space 86 may be sized to accommodate approximately four 4 oz. breaded boneless chicken breast patties. In addition or alternatively, the basket 80 may be biased toward the closed position. For example, the hinges 88 may be spring hinges.

Each basket 80 defines a cage-like construction. In this regard, the bottom portion 84 includes first and second solid side panels 90, 92 coupled together by a plurality of elongate members extending therebetween. The side panels 90, 92 provide side barriers to the basket 80. In the embodiment shown, the elongate members include a leading lower elongate member 100, a middle lower elongate member 102, a trailing lower elongate member 104, and a trailing upper elongate member 106. A catch member 101 (FIG. 4B) is positioned forward of the leading lower elongate member 100. The bottom portion 84 further includes a number of elongate cross-members 108 extending at least between the leading lower and trailing lower elongate members 100, 104 and generally perpendicular thereto such that the bottom portion 84 has a generally webbed configuration (with openings that are sized to allow oil flow into and out of the interior space 86, but not escape of food products when in the closed position) and provides a bottom barrier to the basket 80. In the embodiment shown, the elongate cross-members 108 extend beyond the trailing lower elongate member 104 and are curved upwardly toward the trailing upper elongate member 106 to provide a rear barrier to the basket 80. It will be appreciated that various other configurations of the bottom portion 84 may be used, as may be desired. For example, the solid side panels 90, 92 may be replaced by side panels having a webbed configuration. In any event, the elongate members 100, 102, 104, 106 and/or cross-members 108 are spaced apart to allow the free passage of oil therebetween while inhibiting the passage of food product therebetween, and are constructed of a material having sufficient strength and durability to support food product carried in the basket 80. For example, the elongate members 100, 102, 104, 106 may be metal wires having a diameter of between approximately 0.091 inch and approximately 0.243 inch. In addition or alternatively, the elongate cross-members 108 may be metal wires having a diameter of between approximately 0.062 inch and approximately 0.177 inch.

The lid portion 82 includes a plurality of elongate members 110, 112, 114, 116 generally similar to the elongate members 100, 102, 104, 106 of the bottom portion 84. In the embodiment shown, the elongate members include a leading upper elongate member 110, a middle upper elongate member 112, a trailing upper elongate member 114, and a leading lower elongate member 116. The lid portion 82 further includes a number of elongate cross-members 118 extending at least between the leading upper and trailing upper elongate members 110, 114 and generally perpendicular thereto such that the lid portion 82 has a generally webbed configuration (with openings sized similar to those described above) and provides a top barrier to the basket 80. In the embodiment shown, three of the elongate cross-members 118 terminate at the hooks 88, which are positioned over the trailing upper elongate member 106 of the bottom portion 84 to pivotably couple the lid portion 82 to the bottom portion 84. Also in the embodiment shown, the leading upper elongate member 110 is of a length greater than the distance between the first and second side panels 90, 92 of the bottom portion 84 such that abutment between the distal ends of the leading upper elongate member 110 and the first and second side panels 90, 92 limits rotation of the lid portion 82 relative to the bottom portion 84 to the desired closed position. In the embodiment shown, the elongate cross-members 118 extend beyond the leading upper elongate member 110 and are curved downwardly toward the leading lower elongate member 116 to provide a front barrier to the basket 80 in the closed position. It will be appreciated that various other configurations of the lid portion 82 may be used, as may be desired. In any event, the elongate members 110, 112, 114, 116 and/or cross-members 118 are spaced apart to allow the free passage of oil therebetween while inhibiting the passage of food product therebetween, and are constructed of a material having sufficient strength and durability to suppress buoyant food product carried in the basket 80. For example, the elongate members 110, 112, 114, 116 may be metal wires having a diameter of between approximately 0.091 inch and approximately 0.243 inch. In addition or alternatively, the elongate cross-members 118 may be metal wires having a diameter of between approximately 0.062 inch and approximately 0.177 inch.

In the embodiment shown, the first and second side panels 90, 92 are attached to the first and second chains 60, 62, respectively. In particular, each of the side panels 90, 92 includes a sleeve 120 sized and shaped to receive a projection 122 extending from the respective chain 60, 62. For example, the projection 122 may be an extension of a pin 70 of the chain 60, 62, in one embodiment. In addition or alternatively one or both of the sleeve 120 and projection 122 may be welded to the respective side panel 90, 92. In this manner, the bottom portion 84, and consequently the basket 80, are pivotable relative to the chains 60, 62 about the sleeves 120 and/or projections 122. The sleeves 120 are each positioned approximately halfway along the width of the respective side panel 90, 92 to promote proper balancing of the baskets 80 and avoid accidental pivoting of the bottom portion 84 relative to the chains 60, 62 during operation. It will be appreciated that the basket 80 may be pivotably attached to the chains 60, 62 in other manners without departing from the scope of the invention.

Figure 5:
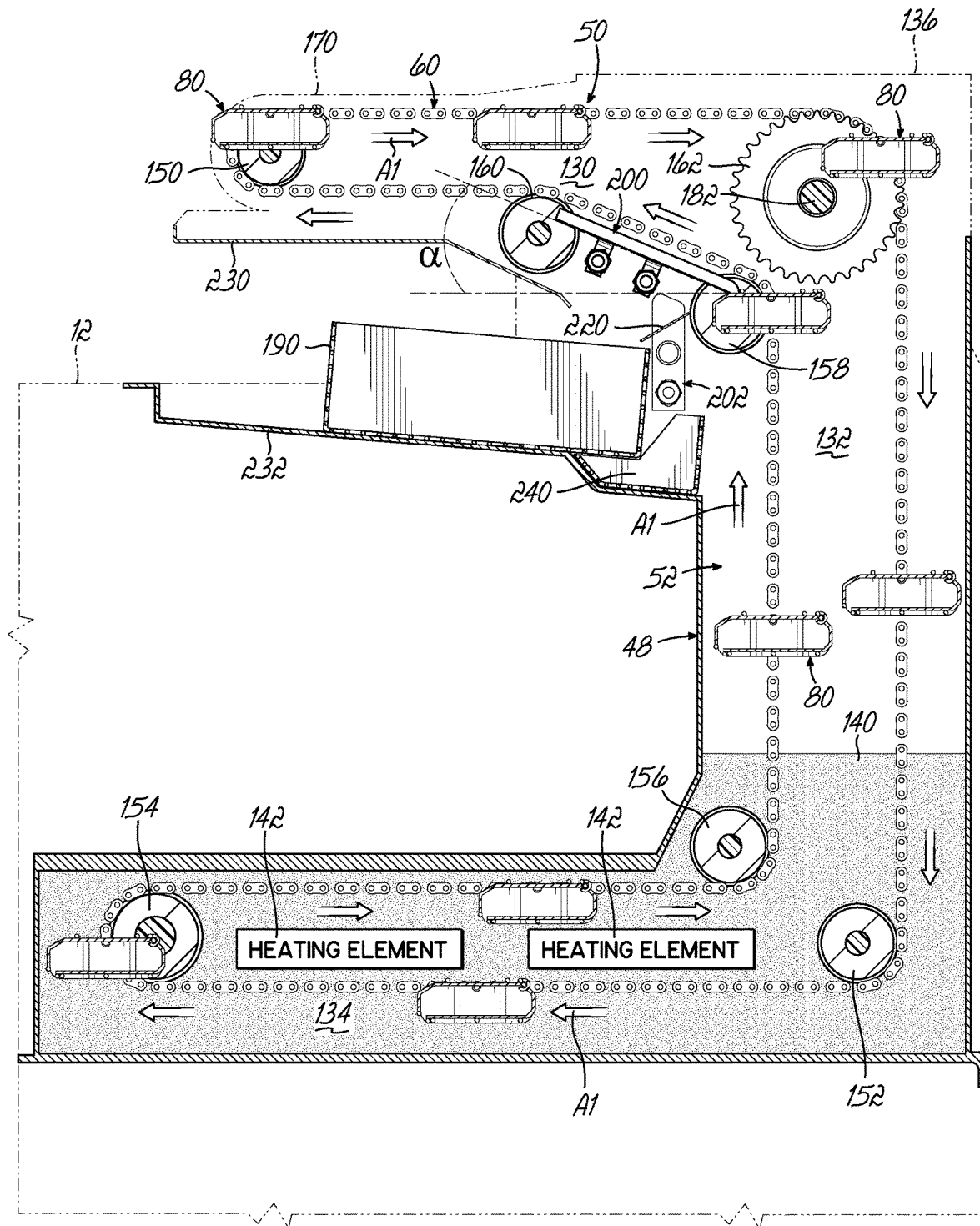
FIG. 5 is a partial cross sectional side view of the fryer of FIG. 1, taken along line 5-5 in FIG. 1, and showing the movement path of the baskets.

With specific reference now to FIG. 5, an interior space of the fryer manifold 48 defines, at least in part, the cooking chamber 52 through which the chain conveyor 50, and thus the baskets 80, are advanced. Nine baskets 80 are shown on the illustrated chain conveyor 50 for the sake of simplicity of illustration. However, any number of baskets 80 may be provided as may be desired. In one exemplary embodiment, the fryer 10 may accommodate thirty-two baskets 80 along the entire movement path of the chains 60, 62. For example, the baskets 80 may be arranged immediately one after another along the chains 60, 62.

As shown, the cooking chamber 52 is generally C-shaped, having a generally horizontal upper portion 130, a generally vertical middle portion 132, and a generally horizontal lower portion 134. A cover plate 136 mounted over the fryer manifold 48 partially covers the upper portion 130. A supply of oil 140 or any other suitable cooking medium is provided to the cooking chamber 52 to at least partially fill the middle and/or lower portions 132, 134 thereof. Thus, the portions of the cooking chamber 52 filled with oil 140 may be collectively referred to as the oil vat of the fryer 10. A number of heating elements 142 are positioned in at least the lower portion 134 of the cooking chamber 52 for heating the oil 140 so as to cook food products submerged therein. In the embodiment shown, two heating elements 142 are positioned in the lower portion 134 of the cooking chamber 52. However, the cooking chamber 52 may include any number of heating elements 142 in any arrangement, as may be desired. As is known, electricity or gas may be selectively supplied to the heating elements 142, and sumps (not shown) may be provided at lowermost portions of the cooking chamber 52 to allow oil drainage therefrom.

As shown, the chain conveyor 50 is positioned over a plurality of rollers in a continuous loop through the fryer 10. More particularly, the first chain 60 is positioned over six idler pulleys 150, 152, 154, 156, 158, 160 arranged at various locations in the fryer 10, and is further positioned over a driven sprocket gear 162 in the upper portion 130 of the cooking chamber 52. While the idler pulleys 150, 152, 154, 156, 158, 160 are illustrated as wheels, it will be appreciated that any or all of the idler pulleys 150, 152, 154, 156, 158, 160 may be sprocket gears. Though not shown in detail, the second chain 62 is positioned over seven idler pulleys arranged at locations corresponding to the six idler pulleys 150, 152, 154, 156, 158, 160 and the driven sprocket gear 162, such that the first chain 60 may be considered a driven chain while the second chain 62 may be considered an idler chain. In this regard, the driven sprocket gear 162 engages with the first chain 60 so that rotating the driven sprocket gear 162 drives the chain conveyor 50 along a movement path, as discussed in further detail below.

In the embodiment shown, the first idler pulleys 150 are positioned substantially external of the cooking chamber 52 while the remaining rollers 152, 154, 156, 158, 160, 162 are positioned within the various portions of the cooking chamber 52. To this end, pulley supports 170, 172 are coupled to and extend from the fryer manifold 48 to provide mounting locations for the first idler pulleys 150. Portions of the pulley supports 170, 172 extend over and conceal the first idler pulleys 150 and adjacent portions of the chains 60, 62. It will be appreciated that the illustrated arrangement is exemplary only and various other arrangements of the various rollers 150, 152, 154, 156, 158, 160, 162 may be used. For example, the locations of the driven sprocket gear 162 and one of the idler pulleys 150, 152, 154, 156, 158, 160 may be switched. In addition or alternatively, the fryer 10 may be equipped with an additional driven sprocket gear and the first and second chains 60, 62 may be positioned over respective driven sprocket gears, such that each of the chains 60, 62 may be considered to be driven chains.

The chain driving assembly 14 includes a motor 180 (FIGS. 1-3) mounted to the cover plate 136 for supplying rotary motion to drive the chain conveyor 50. For example, the motor 180 may include a motor sprocket gear (not shown) which rotates when the motor 180 is activated. The motor sprocket gear may, in turn, engage with a drive chain (not shown) operably coupled to a drive shaft 182. The drive shaft 182 is coupled to the driven sprocket gear 162 so as to transmit the motion from the motor 180 and/or motor sprocket gear to the driven sprocket gear 162 to drive the chain conveyor 50. It will be appreciated that the output rate of the motor 180 and/or the gearing between the motor 180 and the driven sprocket gear 162 correspond to the speed of the chain conveyor 50, which impacts the cooking time of food product in the cooking chamber 52. Thus, these factors may be varied depending on a desired cooking time. In the embodiment shown, a drive chain guard 184 (FIGS. 1-3) is positioned over at least part of the chain driving assembly 14 to conceal the drive chain and/or other components of the chain driving assembly 14.

The movement path of the chain conveyor 50, and thus the baskets 80, is illustrated by the arrows A1. While various directional terms such as "left" and "right" are used herein to describe this path, these terms are used only with respect to the exemplary frame of reference shown in FIG. 5 and are not intended to be limiting. In the embodiment shown, the loop formed by the chain conveyor 50, and thus the movement path, is generally C-shaped. More particularly, each chain 60, 62 is positioned over a total of seven rollers in the upper, middle, and lower portions 130, 132, 134 of the cooking chamber 52 such that the movement path may be generally defined by seven legs.

Initially in the first leg, each basket 80 moves rightward in a generally horizontal manner from the first idler pulleys 150 toward the driven sprocket gear 162 (and corresponding idler pulley with regard to the second chain 62) and into the upper portion 130 of the cooking chamber 52. Prior to entering the cooking chamber 52, the basket 80 may be accessible to a user, such as a restaurant employee, who may manually pivot the lid portion 82 with respect to the bottom portion 84 and/or pivot the bottom portion 84 with respect to the chains 60, 62 in order to access the interior space 86 of the basket 80 and load uncooked food product therein. Thus, this portion of the first leg may be referred to as a loading zone of the fryer 10. The user may subsequently return the basket 80 to the closed position. In addition or alternatively, the baskets 80 may be automatically opened and loaded with uncooked food product, such that the fryer 10 may be considered self-loading. In any event, once closed, the biasing of the basket 80 toward the closed position may prevent the bottom portion 84 from pivoting downwardly to open the basket 80 under the weight of the food product, and the central positioning of the sleeves 120 on the first and second side panels 90, 92 of the bottom portion 84 may assist the basket 80 in maintaining a generally horizontal orientation.

As the basket 80 reaches the end of the first leg, the basket 80 orbits or rotates about the driven sprocket gear 162 into the second leg. During this rotation and others, the pivotable relationship between the basket 80 and the chains 60, 62 allows the basket 80 to maintain its generally horizontal orientation. In the second leg, each basket 80 moves generally vertically downward into the middle portion 132 of the cooking chamber 52 and toward the oil 140 and second idler pulley 152. As the basket 80 is submerged into the oil 140, any food product contained in the basket 80 may begin to cook. The biasing of the basket 80 toward the closed position may prevent the lid portion 82 from pivoting upwardly to open the basket 80 under the buoyancy of the food product in the oil 140. The basket 80 continues along the second leg into the lower portion 134 of the cooking chamber 52 and to its greatest depth within the oil 140, and rotates about the second idler pulley 152 into the third leg.

In the third leg, each basket 80 moves leftward in a generally horizontal manner at the greatest depth within the oil 140 and in the lower portion 134 of the cooking chamber 52 under the heating elements 142 and toward the third idler pulley 154. As the basket 80 reaches the end of the third leg, the basket 80 rotates about the third idler pulley 154 into the fourth leg, which is at a higher location that is lesser in depth within the oil 140 as compared to the third leg. In the fourth leg, each basket 80 moves rightward in a generally horizontal manner in the lower portion 134 of the cooking chamber 52 over the heating elements 142 and toward the fourth idler pulley 156. When the basket 80 reaches the end of the fourth leg, the basket 80 rotates about the fourth idler pulley 156 into the fifth leg. In the fifth leg, each basket 80 moves generally vertically upward into the middle portion 132 of the cooking chamber 52 toward the fifth idler pulley 158 and out of the oil 140. As the basket 80 emerges from the oil 140, any residual oil on the cooked food product may pass through the bottom portion 84 of the basket 80 and drain back into the oil vat.

When the basket 80 reaches the end of the fifth leg, the basket 80 rotates about the fifth idler pulley 158 into the sixth leg. In the sixth leg, the basket 80 moves at an incline in a generally upward and leftward manner over a hopper 190 into the upper portion 130 of the cooking chamber 52 and toward the sixth idler pulley 160. As shown, the incline of the sixth leg is relatively gentle to provide proper unloading of cooked food products, as discussed in greater detail below. For example, this incline may be defined by an angle α of between approximately 10 degrees and approximately 30 degrees with respect to horizontal. In one embodiment, the incline may be defined by an angle α of approximately 20 degrees with respect to horizontal. Unlike the previous legs and transitions between legs, the sixth leg and/or transition from the fifth leg into the sixth leg are configured to reorient and/or open the basket 80.

In this regard, and with reference to FIGS. 6A-6E, a lid rail catch bar 200 and a bottom rail catch bar 202 are provided proximate to the sixth leg. More particularly, the lid rail catch bar 200 extends along substantially the entire length of the sixth leg and parallel thereto. Thus, the lid rail catch bar 200 may also be oriented relative to horizontal by about the angle α. As shown, the lid rail catch bar 200 is mounted to the fryer manifold 48 via brackets 204 and fasteners 206. The lid rail catch bar 200 includes a cam surface 208 and a top surface 210 which are configured to engage with the leading upper elongate member 110 of the lid portion 82 (FIG. 6A) during the transition of the basket 80 into the sixth leg, such that the leading upper elongate member 110 may ride along the lid rail catch bar 200 during the sixth leg.

Figure 6A:
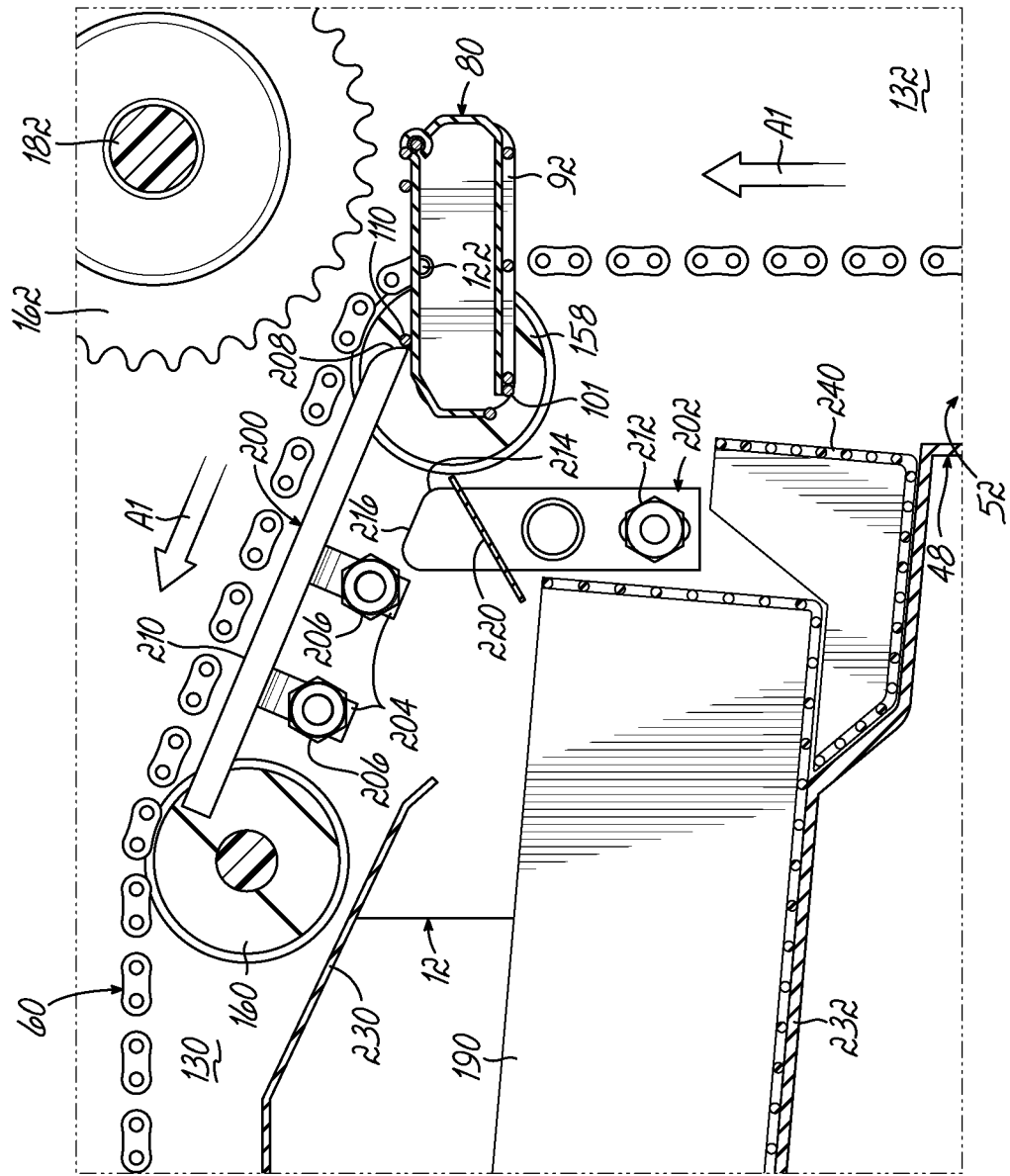
FIGS. 6A-6E are partial cross sectional side views similar to FIG. 5, magnified to show a series of steps in the automatic opening and closing of a basket by the lid rail catch bar and bottom rail catch bar.
Figure 6B:
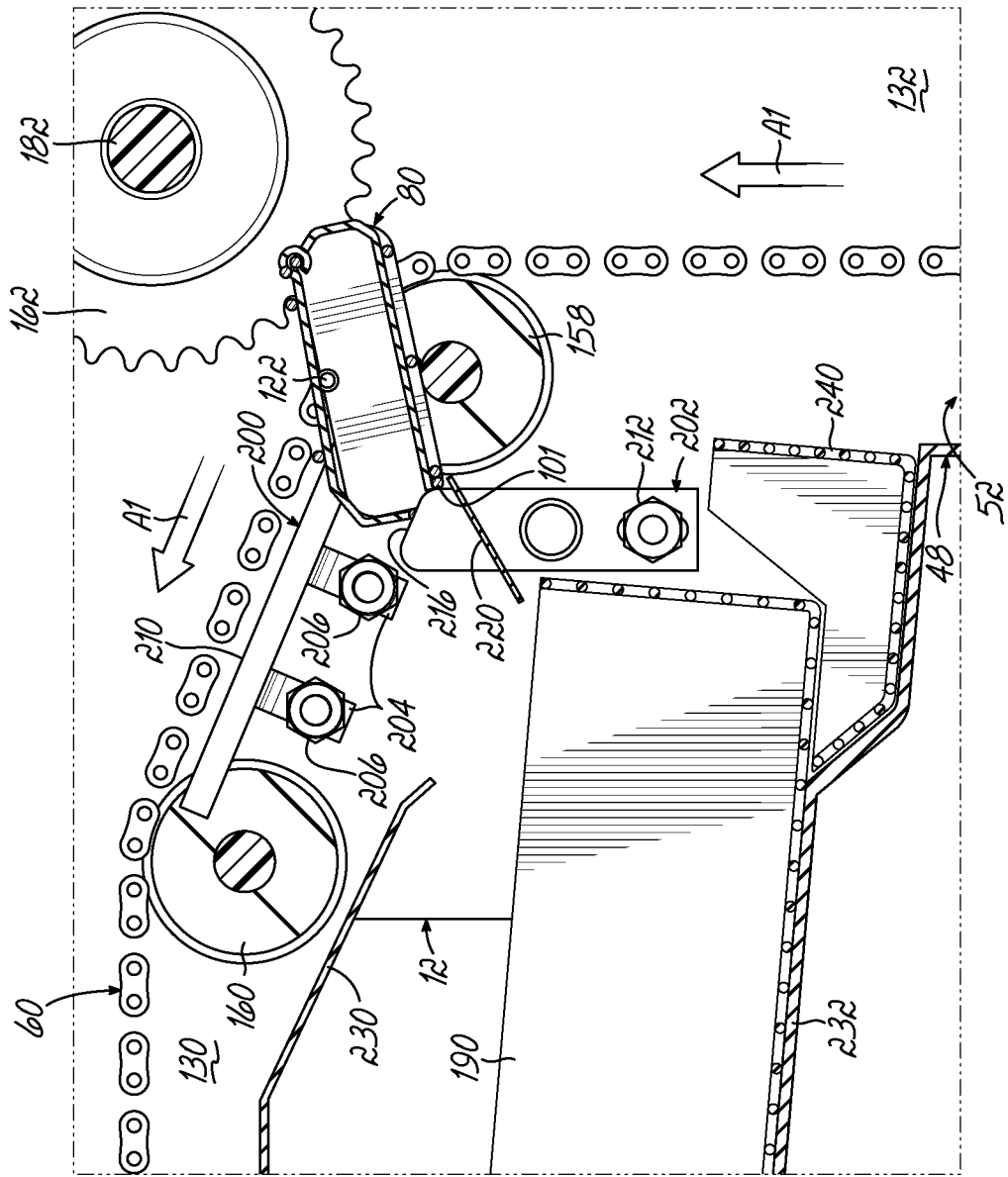
Figure 6C:
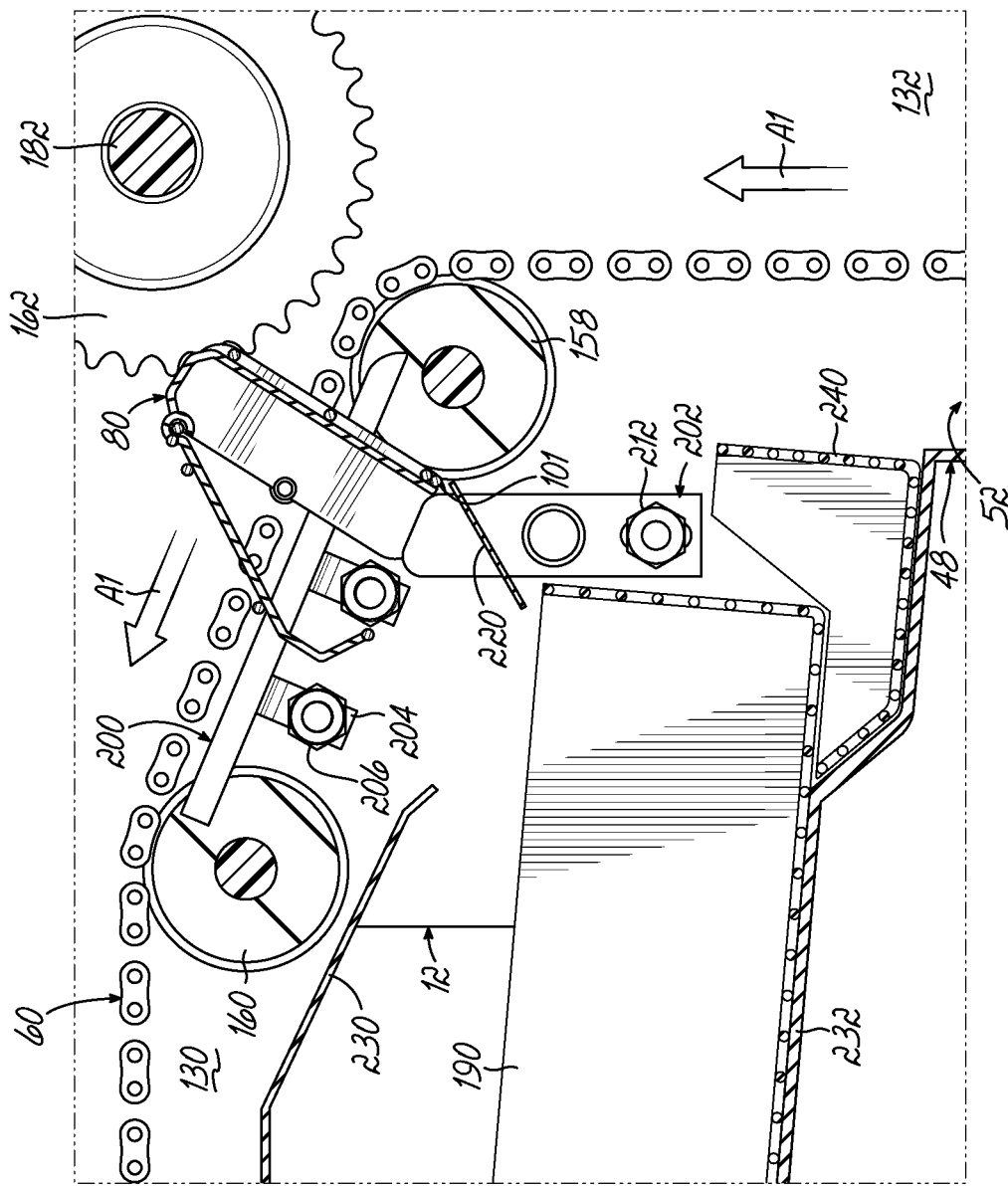

The bottom rail catch bar 202 is mounted to the fryer manifold 48 via a fastener 212 and includes an abutment surface 214 and an inclined top surface 216. In the embodiment shown, the inclined top surface 216 is parallel to the lid rail catch bar 200 and the sixth leg, and thus may also be oriented relative to horizontal by about the angle α. The abutment surface 214 is configured to avoid interfering with the advancement of the lid portion 82 and to abut the catch member 101 (and/or the leading lower elongate member 100 of the bottom portion 84 and/or the distal ends of the elongate cross-members 108) (FIG. 6B) during the transition of the basket 80 into the sixth leg, such that forward progress of the bottom portion 84 is temporarily halted and/or slowed while the chains 60, 62 continue to advance. As a result, the bottom portion 84 is forced against the bias toward the closed position (if present) to pivot counterclockwise relative to the chains 60, 62 about the sleeves 120 and/or projections 122 toward a near vertical orientation (FIG. 6C). The lid rail catch bar 200 prevents the lid portion 82 from pivoting along with the bottom portion 84, and consequently causes the basket 80 to open as the chains 60, 62 continue to advance along the sixth leg.

Figure 6D:
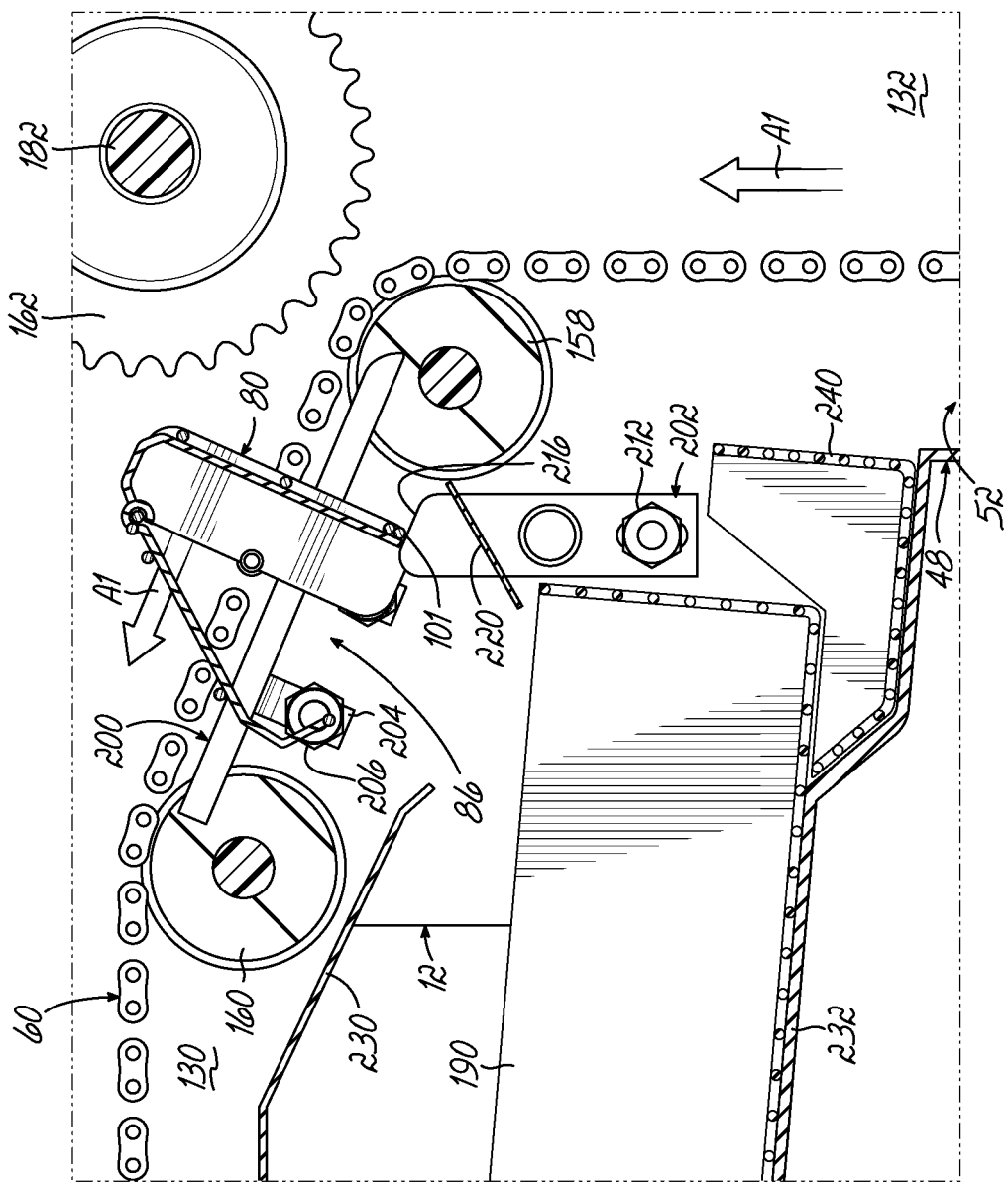

With the bottom portion 84 in a near-vertical orientation and the basket 80 opened, any food product contained in the basket 80 may slide along the bottom portion 84 and automatically dispense into the hopper 190. To this end, an unloading ramp 220 may be provided between the abutment surface 214 of the bottom rail catch bar 202 and the hopper 190 for directing food product from the bottom portion 84 into the hopper 190. The elongate cross-members 108 of the bottom portion may promote sliding of the food product as a result of their being oriented substantially parallel to the direction in which the food slides. In this regard, the elongate members 100, 102, 104, 106 of the bottom portion 84, which are perpendicular to the sliding direction, are on the undersides of the elongate cross-members 108 so as to avoid having joints between the members 100, 102, 104, 106 and cross-members 108 positioned in the flow path of food product, which could interfere with the free sliding of the food product along the elongate cross-members 108 when the basket is to be emptied at the sixth leg of movement. As the basket 80 continues its travel leftwards and upwards following the movement path, the catch member 101 follows the path on the bottom rail catch bar 202 from the abutment surface 214 to the inclined top surface 216 (FIG. 6D). Because the inclined top surface 216 is parallel to the movement path, the basket 80 remains in the open position as long as the catch member 101 and the inclined top surface 216 remain in contact with each other.

Figure 6E:
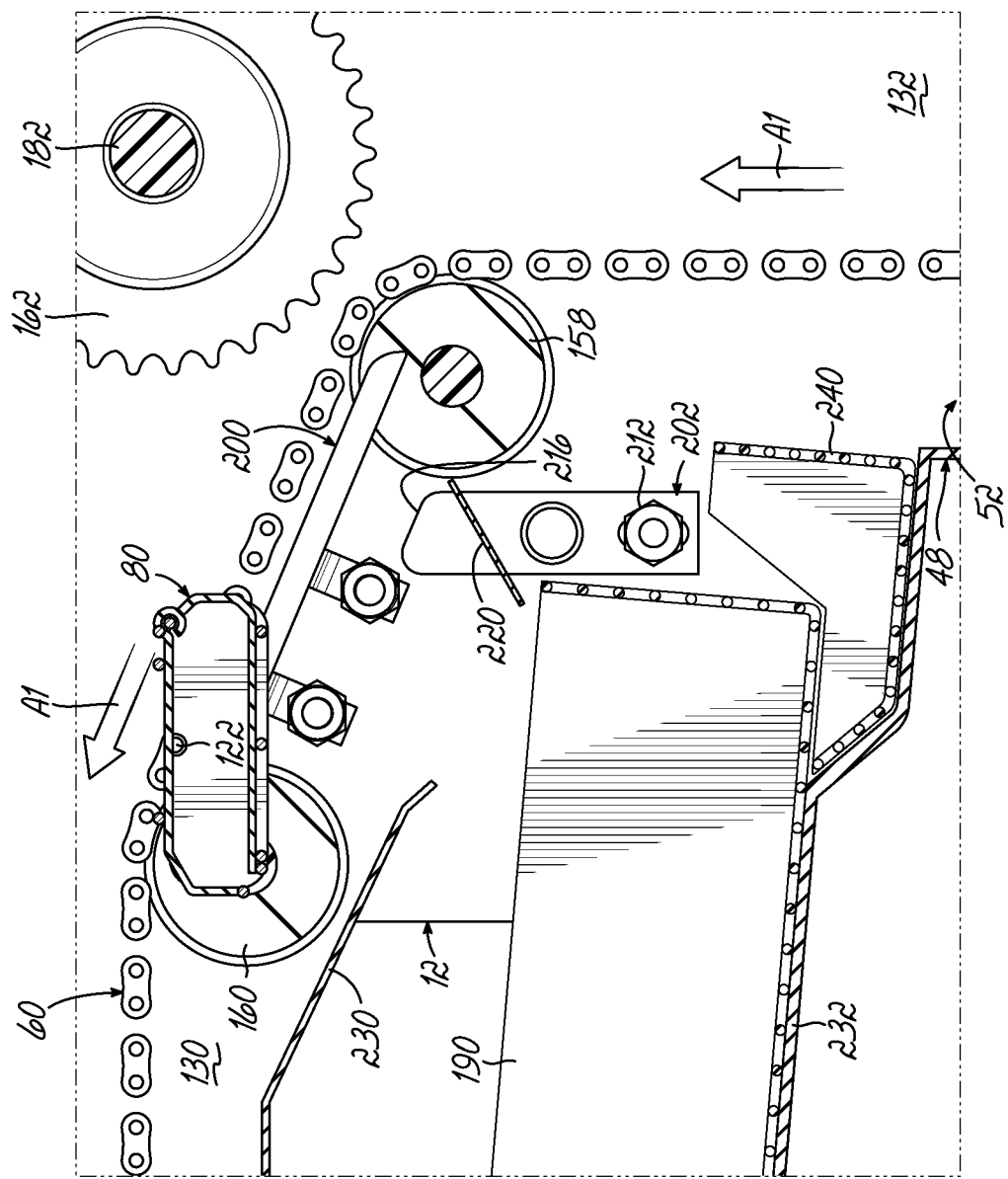
Figure 7:
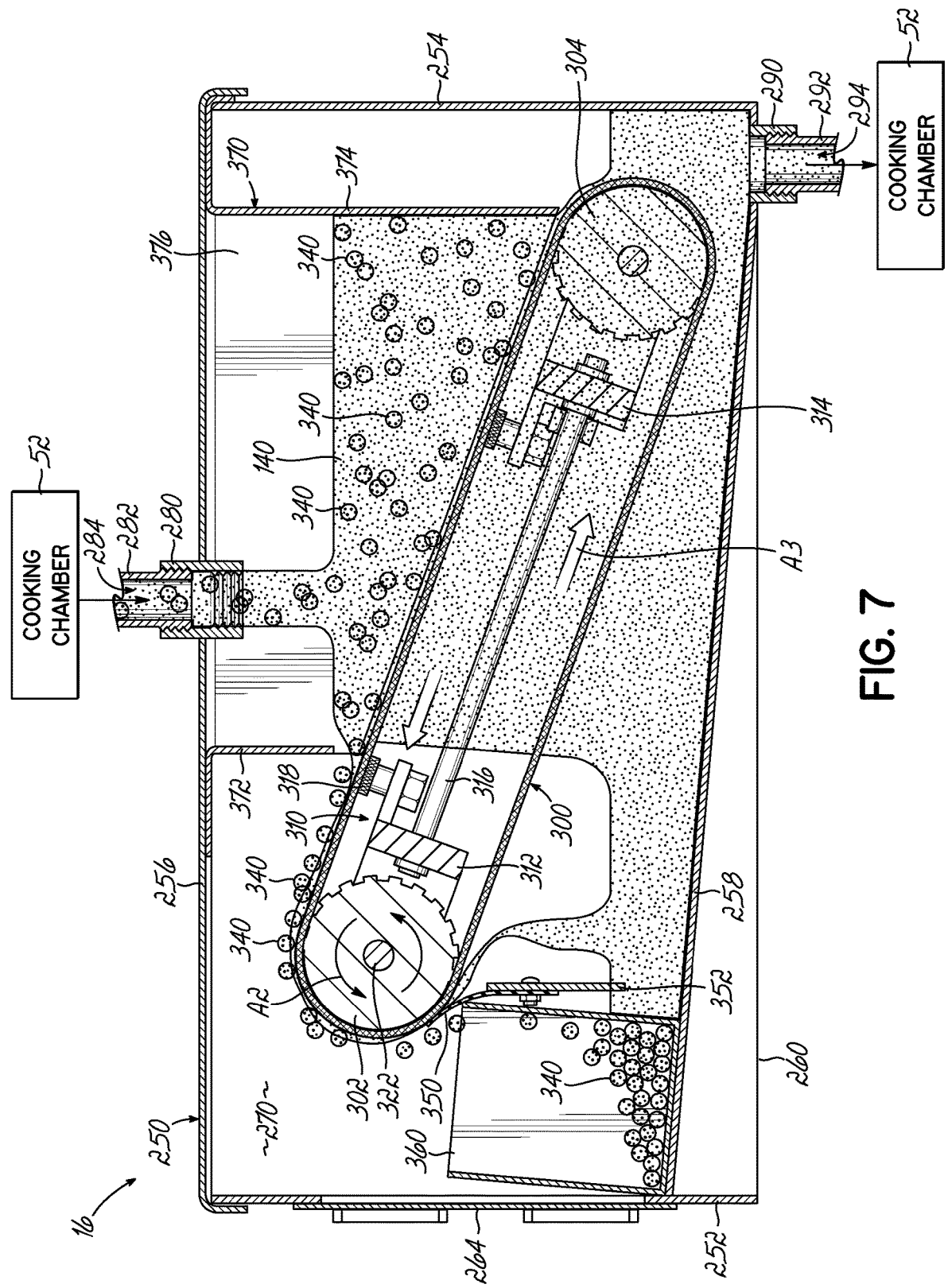
FIG. 7 is a cross sectional side view of the oil filtration system shown in FIG. 1, taken along line 7-7 in FIG. 1, and showing the continuous filtration of the oil by the belt and scraper of the oil filter.

During this period, any remaining food product may be dispensed from the bottom portion 84 to the hopper 190. Thus, the fryer 10 may be considered a self-unloading fryer, and the portions of the sixth leg wherein the basket 80 is opened and the bottom portion 84 is oriented toward vertical for unloading may be collectively referred to as an unloading zone of the fryer 10. When the catch member 101 clears the bottom rail catch bar 202, the biasing of the basket 80 toward the closed position causes the lid portion 82 and bottom portion 84 to pivot relative to each other to return the basket 80 to the closed position, and the central positioning of the sleeves 120 on the first and second side panels 90, 92 of the bottom portion 84 urges the basket 80 to return to a generally horizontal orientation (FIG. 6E). Alternatively, if the basket 80 is not biased toward the closed position, the bottom portion 84 may return to a generally horizontal orientation while the lid portion 82 may remain pivoted relative to the bottom portion 84 such that the basket 80 remains in an open position.

As the basket 80 reaches the end of the sixth leg, the basket 80 orbits or rotates about the sixth idler pulley 160 into the seventh leg while maintaining a generally horizontal orientation as previously described. In the seventh leg, each basket 80 moves leftward in a generally horizontal manner toward the first idler pulley 150. During this period, the basket 80 travels over a basket guard 230 mounted to the fryer manifold 48. When the basket 80 reaches the end of the seventh leg, the basket 80 rotates about the first idler pulley 150 and returns to the loading zone of the first leg, where it may be reloaded. If the basket 80 is not biased toward the closed position, the basket may be closed by personnel or the lid portion may contact a ceiling surface of the cooking chamber 52 (e.g., defined by the cover plate 136) to urge the basket 80 to the closed position. In any event, each basket 80 continuously repeats movement along this path during operation of the fryer 10.

As shown, the hopper 190 freely rests on a shelf 232 of the fryer manifold 48 below the unloading zone. In one embodiment, the hopper 190 is of a mesh or screen-like construction, such that any residual oil on cooked food product dispensed therein may drain from the hopper 190 back into the oil vat. The shelf 232 and/or hopper 190 are inclined downwardly toward the oil vat to promote such oil drainage. A crumb sieve 240 is positioned between the hopper 190 and the oil vat to remove residual crumbs or other particles from the oil as it drains into the oil vat. When a desired amount of cooked food product has been dispensed into the hopper 190, the hopper 190 may be removed from the shelf 232 by a user. For example, the hopper 190 may be removed to the table top 40 for further preparation and/or handling of the cooked food product.

In the embodiment shown, cooking of the food primarily occurs in the lower portion 134 of the cooking chamber 52 during at least portions of the second, third, fourth, and fifth legs. Some cooking may occur in the middle portion 132 of the cooking chamber 52 depending on, for example, the particular configuration of the loop and the location of the surface of the oil 140. In this regard, the chain conveyor 50 is advanced along the movement path via the motor 180 at a predetermined speed that corresponds to the required cook time of a particular food product in the oil 140. It will be appreciated that the required cook time will vary depending on a number of factors such as the type of food product and the temperature of the oil 140. To this end, the control panel 42 may be operatively coupled to the motor 180 to allow a user to select a desired speed of the chain conveyor 50 for a particular cooking operation. In addition or alternatively, the control panel 42 may be operatively coupled to one or more of the heating elements 142 to allow a user to select a desired temperature of the oil 140. In any event, the movement speed may remain constant during a particular cooking operation such that each basket 80 of food product is cooked in the oil 140 for the same desired set point cooking time.

The movement path of the baskets 80 through the fryer 10 permits the fryer 10 to cook a large volume of food while remaining relatively compact in comparison to typical fryers. In one embodiment, a cooking operation in the fryer 10 may allow cooking food product at approximately twice the cooking rate of a standard two-well fryer of the same footprint. Thus, the fryer 10 is capable of cooking a high volume of food products in a relatively small space.

With specific reference now to FIGS. 1-3 and 7, the continuous oil filtration system 16 includes a filter housing 250 having a number of panels including a front panel 252, a rear panel 254, a top panel 256, a bottom panel 258, and side panels 260, 262, and a door 264 which together define an interior space 270 of the filter housing 250. As shown, the filter housing 250 is mounted to the cover plate 136 via brackets 272. An inlet pipe fitting 280 and/or inlet pipe 282 define an inlet channel 284 and are fluidly coupled to the interior space 270 at or near the top panel 256, such that gravity may promote dispensing of oil from the inlet channel 284 into the interior space 270. Similarly, an outlet pipe fitting 290 and/or outlet pipe 292 define an outlet channel 294 and are fluidly coupled to the interior space 270 at or near a lowermost portion of the bottom panel 258, such that gravity may promote flow of oil from the interior space 270 into the outlet channel 294. In this regard, the bottom panel 258 is sloped toward the outlet channel 294. Though not shown in detail, each of the inlet and outlet pipe fittings 280, 290 and/or pipes 282, 292 may be fluidly coupled to the cooking chamber 52 via hoses, for example. More particularly, the inlet pipe fitting and/or pipe 280, 282 may be fluidly coupled to a sump of the cooking chamber 52, and an oil filtration pump (not shown) may circulate unfiltered oil from the sump to the inlet channel 284 for dispensing into the interior space 270 of the filter housing 250. Similarly, the outlet pipe fitting and/or pipe 290, 292 may be fluidly coupled to, for example, the middle or lower portion 132, 134 of the cooking chamber 52 for dispensing filtered oil into the oil vat of the cooking chamber 52. While the illustrated inlet channel 284 is spaced apart from the surface of the oil 140 in the interior space 270 of the filter housing 250, the inlet channel 284 may be submerged in the oil 140 such that the oil being dispensed from the inlet channel 284 may not drop through the air. In this manner, aeration of the oil may be avoided.

A conveyor belt 300 is positioned in the interior space 270 below the inlet channel 284 for selectively advancing oil and/or debris contained therein through the interior space 270. In this regard, the conveyor belt 300 is positioned over a driven sprocket gear 302 and an idler sprocket gear 304, which engage with the conveyor belt 300 such that rotating the driven sprocket gear 302 drives the conveyor belt 300. In the embodiment shown, the driven and idler sprocket gears 302, 304 are spaced apart from each other by a conveyor support assembly 310. More particularly, the sprocket gears 302, 304 are mounted to respective brackets 312, 314 which are coupled together by a support shaft 316. The length of the support shaft 316 may be adjustable to change the spacing of the sprocket gears 302, 304 such as, for example, to take in or take out slack in the conveyor belt 300. In any event, belt support pads 318 are mounted to each of the brackets 312, 314 for supporting the conveyor belt 300, particularly when under the weight of oil and/or debris dispensed thereon.

The continuous oil filtration system 16 includes a motor 320 mounted to the filter housing 250 for supplying rotary motion to drive the conveyor belt 300. For example, the illustrated motor 320 includes a motor output shaft 322 which rotates when the motor 320 is activated, and the motor output shaft 322 extends through the side panel 260 into the interior space 270 and is coupled to the driven sprocket gear 302 so as to transmit the motion from the motor 320 and/or motor output shaft 322 to the driven sprocket gear 302 to drive the conveyor belt 300. In the embodiment shown, counterclockwise rotation of the motor output shaft 322, illustrated by the arrows A2, causes movement of the conveyor belt 300 in a generally counterclockwise direction, illustrated by the arrows A3.

In the embodiment shown, the conveyor belt 300 is of a mesh or screen-like construction such that oil 140 may pass therethrough while undesirable particles such as crumbs 340 contained in the oil 140 may not. In this manner, as the conveyor belt 300 is advanced, the crumbs 340 and some residual oil may advance therewith, while the remaining oil may pass through the conveyor belt 300 into a lower portion of the interior space 270 toward the outlet channel 294. As shown, the conveyor belt 300 is inclined downwardly toward the outlet channel 294 to promote the flow of oil 140 toward the outlet channel 294 and/or through the conveyor belt 300 and thus limit the amount of oil 140 riding along the conveyor belt 300.

A scraper 350 is mounted in the interior space 270 and is configured to contact the conveyor belt 300 to inhibit the advancement of the crumbs 340 traveling on the conveyor belt 300. More particularly, the scraper 350 is positioned to contact the conveyor belt 300 as the conveyor belt 300 rotates about the driven sprocket gear 302 in order to force the crumbs 340 off of the conveyor belt 300. As shown, the scraper 350 is mounted to the filter housing 250 via a bracket 352 and is constructed of a semi-flexible material so as to avoid interfering with the advancement of the conveyor belt 300 itself. For example, the scraper 350 may be constructed of a thin gauge stainless steel, spring steel, and/or Teflon®. It will be appreciated that the configuration and arrangement of the scraper 350 may vary from the illustrated embodiment without departing from the scope of the invention. In any event, a crumb bucket 360 is positioned adjacent the scraper 350 to receive the crumbs 340 scraped from the conveyor belt 300. At various intervals, such as when the crumb bucket 360 is substantially filled, a user may access the crumb bucket 360 via the door 264 to empty and/or clean the crumb bucket 360. In certain embodiments, this may be performed while the continuous oil filtration system 16 continues to operate.

As shown, the scraper 350 allows the residual oil on the conveyor belt 300 to pass therethrough. In some embodiments, such residual oil may cling to the conveyor belt 300 during the rotation about the driven sprocket gear 302 and after passing the scraper 350 may release from the conveyor belt 300 and pour into a lower portion of the interior space 270.

In the embodiment shown, an unfiltered oil compartment 370 is defined within the interior space 270 around the inlet channel 284 and between the top panel 256 and the conveyor belt 300 so as to limit the space in which unfiltered oil (shown as oil with crumbs in FIG. 7) may flow from the inlet channel 284. For example, the illustrated unfiltered oil compartment 370 includes a forward wall 372, a rearward wall 374, and at least one side wall 376 extending therebetween. Each of the walls 372, 374, 376 extends downwardly from the top panel 256 toward the conveyor belt 300. As shown, the rearward and side walls 374, 376 terminate at or near the conveyor belt 300 to prevent oil 140 from reaching the outlet channel 294 without first being filtered by at least one of the conveyor belt 300, the scraper 350, and/or the walls 374, 376 themselves. In this regard, the rearward and side walls 374, 376 are spaced apart from the conveyor belt 300 to allow oil 140 to pass therebetween while preventing crumbs 340 from passing therebetween. The forward wall 372, on the other hand, is spaced apart from the conveyor belt 300 sufficiently to allow the crumbs 340 to pass therebetween so that the crumbs 340 may be advanced toward the scraper 350 for removal from the oil 140.

Thus, the continuous oil filtration system 16 may ensure that substantially all of the oil 140 received from the cooking chamber 52 via the inlet channel 284 is sufficiently filtered prior to being returned to the cooking chamber 52 via the outlet channel 294. In one embodiment, the motor 320 and/or pump may be operatively coupled to the control panel 42 such that a user may selectively activate an oil filtration cycle of the fryer 10 and thereby begin operation of the motor 320 and/or pump. In addition or alternatively, the motor 320 and/or pump may be continuously operated during a cooking operation of the fryer 10, such that no dedicated filtration cycle is required. In this manner, advancement of the baskets 80 along their movement path and thus food product cooking may continue uninterrupted while the oil 140 is treated.

As described herein, various components of the fryer 10 such as the chains 60, 62, baskets 80, rollers 150, 152, 154, 156, 158, 160, 162, and conveyor belt 300 are exposed to oil during cooking operations. Therefore, any or all of these components may be constructed of a highly corrosion resistant material such as, for example, 304 stainless steel.

While various legs of the movement path of the baskets 80 are shown and described herein as being "vertical" or "horizontal," it will be appreciated that such legs may be substantially vertical or substantially horizontal. For example, such legs may be oriented within a few degrees of vertical or horizontal. In one embodiment, such legs may be oriented within 5° of vertical or horizontal.

While the present invention has been illustrated by the description of various embodiments thereof, and while the embodiments have been described in considerable detail, it is not intended to restrict or in any way limit the scope of the appended claims to such detail. Thus, the various features discussed herein may be used alone or in any combination. Additional advantages and modifications will readily appear to those skilled in the art. The invention in its broader aspects is therefore not limited to the specific details and illustrative examples shown and described. Accordingly, departures may be made from such details without departing from the scope of the general inventive concept.

What is claimed is:

1. An oil filtration system for a fryer, comprising:
a housing defining an interior space and including an inlet for supplying unfiltered oil to the interior space and an outlet for dispensing filtered oil from the interior space, the unfiltered oil containing particles of debris collected from food products during operation of the fryer;
a conveyor belt positioned in the interior space for receiving the unfiltered oil from the inlet and for advancing at least a portion of the unfiltered oil through the interior space, the conveyor belt formed from material that allows passage of oil without particles towards the outlet; and
a scraper positioned in the interior space, wherein at least a portion of the scraper contacts the conveyor belt to inhibit advancement of particles within the oil on the conveyor belt, thereby converting the unfiltered oil into filtered oil before flow towards the outlet,
wherein the inlet is located at a top of the housing and the outlet is located at a bottom of the housing such that gravity promotes movement of oil through the housing from the inlet to the outlet.

2. The oil filtration system of claim 1, wherein the housing includes a bottom panel defining the bottom of the housing, the bottom panel being sloped towards the outlet.

3. The oil filtration system of claim 1, wherein the conveyor belt is advanced by a driven sprocket gear rotated by a motor.

4. The oil filtration system of claim 1, wherein the conveyor belt is mounted within the housing so as to be inclined downwardly toward the outlet.

5. The oil filtration system of claim 1, wherein the scraper is constructed of a thin-gauge stainless steel, spring steel, and/or polytetrafluoroethylene material to avoid interfering with advancement of the conveyor belt.

6. The oil filtration system of claim 1, further comprising a crumb bucket positioned adjacent the scraper to receive crumbs and debris scraped off the conveyor belt by the scraper.

7. The oil filtration system of claim 1, wherein the conveyor belt divides the interior space within the housing into an unfiltered oil compartment on one side of the conveyor belt and a filtered oil compartment on another side of the conveyor belt.

8. The oil filtration system of claim 1, wherein the conveyor belt is continuously driven such that continuous filtration of oil occurs during cooking with the fryer.

9. A method of filtering oil for a fryer, comprising:
supplying unfiltered oil to an interior space of a housing, the unfiltered oil containing particles of debris collected from food products during operation of the fryer;
advancing at least a portion of the unfiltered oil through the interior space via a conveyor belt formed from material that allows passage of oil without particles towards an outlet of the housing;
scraping the conveyor belt with a scraper positioned in the interior space to inhibit advancement of particles within the oil on the conveyor belt, thereby converting the unfiltered oil into filtered oil before flow towards the outlet; and
dispensing the filtered oil from the interior space of the housing to a cooking chamber of the fryer,
wherein the unfiltered oil is supplied to the interior space via an inlet that is located at a top of the housing, and the filtered oil is dispensed from the interior space via the outlet that is located at a bottom of the housing, such that gravity promotes movement of oil through the interior space in the housing from the inlet to the outlet.

10. The method of claim 9, wherein the conveyor belt is operatively connected to a motor by a driven sprocket gear, and the step of advancing at least a portion of the unfiltered oil through the interior space via the conveyor belt further comprises:
rotating the driven sprocket gear with the motor to move the conveyor belt and thereby move particles of debris towards the scraper.

11. The method of claim 9, wherein the conveyor belt is mounted within the housing so as to be inclined downwardly toward the outlet, and the step of advancing at least a portion of the unfiltered oil through the interior space via the conveyor belt further comprises:
moving the conveyor belt to move particles of debris upwardly away from the outlet and a flow of oil towards the outlet.

12. The method of claim 9, wherein the step of scraping the conveyor belt with a scraper further comprises:
depositing crumbs and particles of debris scraped from the conveyor belt into a crumb bucket positioned adjacent the scraper.

13. The method of claim 9, further comprising:

driving the conveyor belt to move continuously such that continuous filtration of oil occurs during cooking with the fryer.

14. The method of claim 12, wherein the housing includes a door providing selective access into the interior space, the crumb bucket is positioned within the interior space of the housing, and the method further comprises:

accessing the crumb bucket via the door to empty and/or clean the crumb bucket.

15. The oil filtration system of claim 6, wherein the housing includes a door providing selective access into the interior space, the crumb bucket is positioned within the interior space of the housing, and the crumb bucket is accessed via the door to empty and/or clean the crumb bucket.

* * * * *